(12) United States Patent
Sutcliffe

(10) Patent No.: US 6,444,003 B1
(45) Date of Patent: Sep. 3, 2002

(54) FILTER APPARATUS FOR SWEEPER TRUCK HOPPER

(76) Inventor: Terry Lee Sutcliffe, 1351 Ribaut Rd., Port Royal, SC (US) 29935

( * ) Notice: Subject to any disclaimer, the term of this patent is extended or adjusted under 35 U.S.C. 154(b) by 0 days.

(21) Appl. No.: 09/757,098

(22) Filed: Jan. 8, 2001

(51) Int. Cl.[7] ............................................. A47L 11/202
(52) U.S. Cl. ...................... 55/385.1; 55/385.3; 55/482; 55/521; 15/340.4; 15/347; 15/349
(58) Field of Search ...................... 55/482, 484, 385.1, 55/385.3, 501, 516, 521, DIG. 31; 15/340.3, 340.4, 347, 349, 352

(56) References Cited

U.S. PATENT DOCUMENTS

| | | | | |
|---|---|---|---|---|
| 3,304,572 | A | * 2/1967 | Wendel | 15/340.3 |
| 3,354,622 | A | * 11/1967 | Murphy, Jr. | 55/484 |
| 3,354,623 | A | * 11/1967 | Keller | 55/484 |
| 3,639,940 | A | * 2/1972 | Carlson et al. | 15/340.3 |
| 3,810,350 | A | 5/1974 | Scholl | |
| 4,006,511 | A | 2/1977 | Larsen | |
| 4,219,901 | A | * 9/1980 | Burgoon et al. | 15/352 |
| 4,310,944 | A | 1/1982 | Kroll et al. | |
| 4,328,014 | A | 5/1982 | Burgoon et al. | |
| 4,514,875 | A | * 5/1985 | Comer | 15/352 |
| 4,554,701 | A | 11/1985 | Van Raaij | |
| 5,090,083 | A | * 2/1992 | Wulff | 15/347 |
| 5,093,955 | A | * 3/1992 | Blehert et al. | 15/349 |
| 5,194,077 | A | 3/1993 | Bargiel et al. | |
| 5,223,011 | A | * 6/1993 | Hanni | 55/484 |
| 5,409,512 | A | 4/1995 | Wilkerson et al. | |
| 5,512,079 | A | * 4/1996 | Hanni et al. | 55/484 |
| 5,733,350 | A | * 3/1998 | Muller et al. | 55/482 |
| 5,943,733 | A | 8/1999 | Tagliaferri | |
| 5,996,171 | A | 12/1999 | Bowers | |

OTHER PUBLICATIONS

TYMCO Regenerative Air Sweepers, 1996, 2 pages, TYMCO, Inc., Waco, TX, USA.
TYMCO The Regenerative Air System, 1994, 2 pages, TYMCO, Inc., Waco, TX, USA.

* cited by examiner

Primary Examiner—David A. Simmons
Assistant Examiner—Minh-Chau T. Pham
(74) Attorney, Agent, or Firm—Harleston Law Firm LLC; Kathleen M. Harleston

(57) ABSTRACT

A filter apparatus (10) for use in a hopper section (11) of a sweeper truck includes: (a) a horizontal, rectangular, screened main frame portion (20) for attachment within the hopper section (11), (b) a mechanism for attaching the filter apparatus (10) to the hopper section (11); and (c) at least one V-shaped filter section (26), which extends downwardly to a point from the main frame portion (20) in a vertical direction, an upper portion of the V-shaped filter section being attached to the main frame portion, the V-shaped filter section being covered with a screen. Also included is a V-shaped filter device, which includes: (a) two rectangular, similarly-shaped, screened side portions (27) extending in a downward direction from an upper portion of the hopper section (11), the side portions (27) being joined to each other along their base; (b) two triangular shaped end screen portions (33), extending across the ends of the V-shaped filter device (26); (c) a mechanism of attaching (22) the V-shaped filter device to the hopper section; and (d) a mechanism for opening (31, 32) and closing one of the side portions (27) along its base. The V-shaped filter device (26) deflects debris downward into the bottom of the hopper and temporarily collects debris between the side portions (27).

19 Claims, 6 Drawing Sheets

FILTER APPARATUS FOR SWEEPER TRUCK HOPPER

BACKGROUND OF THE INVENTION

1. Technical Field

The present device is a filter apparatus for use in a hopper of a sweeper truck, which channels debris to the collection container in the bottom of the hopper, thereby preventing the debris from clogging the truck's inlet and outlet ports and necessitating frequent emptying of the collection container.

2. Background Information

From sports stadiums to shopping mall parking lots, public parks to city streets, a large gathering of people goes hand in hand with the generation of garbage. Large crowds can generate large amounts of garbage, the cleanup of which becomes a cost prohibitive challenge. The garbage collected in football stadiums, and at other sporting events is mostly made up of paper items, including food wrappers and drink cups. Large scale cleanup of trash and debris is required in many commercial and industrial settings. The need to pick up debris also arises in the context of land development. Once cut-down trees and other large pieces have been removed from the area, vacuum sweeper trucks may be used to collect the smaller branches and leaves.

Conventional vacuum sweeper truck systems are well-suited to collect this type of garbage. Vacuum sweeper trucks generally have a sweeper brush, a hopper in the rear where the trash is held for dumping, a flat screen at the top of the hopper, a vacuum source mounted to the truck chassis with a hose or other device for suctioning the debris. Vacuum sweepers use blasts of air and generate suction to dislodge and pick up trash, dirt, and other debris. The air circulates through the hoppers and is exhausted back into the atmosphere. The speed and force of the airflow decreases as it flows through the system and gravitational force causes the large pieces of debris to fall down into the bottom of the hopper, removing them from the flow of suctioned air.

The flat screens in conventional vacuum sweeper trucks tend to become clogged by debris. Small, lightweight particles such as leaves and paper often accumulate on the surface, which clogs the screen and decreases its efficiency. Even if they are not caught in the screen the first time through, the lightweight particles tend to blow around in the hopper until they are eventually caught in the screen. The truck operator has to stop his or her work, drive to a dumpster, and empty the hopper. Even though the bottom of the hopper is not full, he must repeatedly interrupt his work in order to empty the hopper. Otherwise, the truck is not operating efficiently, and additional stress is put on the vacuum pump, etc. This may cause the truck to wear out more quickly than it would have otherwise.

The filter apparatus of the present invention solves these problems with one or more V-shaped filter sections. The filter sections block the problematic lightweight particles of debris and cause them to fall down into the bottom of the hopper, where they are held for dumping. Any recirculated particles are similarly blocked by the V-shaped filters of the present invention. The V-shaped filter sections do not clog up easily, and the hopper need not be emptied as frequently. Any particles of debris which accumulate inside the V-shaped filter sections are held until they are released, preferably via a hinged cleaning rod. The filter sections of the present invention are cleared of accumulated debris by simply pulling the cleaning rod toward the rear of the hopper. This opens the bottom of the V-shaped filter sections and allows the collected debris to fall down to the bottom of the hopper. There is no need to empty the hopper before it is full, which saves time and labor and makes the truck operator's job less stressful. Also, the present filter apparatus traps smaller detritus, which decreases the amount of particulate matter released back into the ambient air.

The present invention provides a novel way of collecting lightweight or small sized particulate matter and moving it into collection containers so that it does not interfere with the efficient operation of the sweeper truck and it is not re-released into the recently swept environment via the exhaust air. The V-shaped filter is inexpensive and can be readily adapted to fit any size sweeper truck or collection container. The ability to quickly and easily release the material which has accumulated on the V-shaped filter minimizes the time required to maintain optimal air filtering efficiency and eases the frustration of the operator.

BRIEF SUMMARY OF THE INVENTION

The present invention includes a filter apparatus for use in a sweeper truck. The apparatus includes: (a) a main frame portion adapted for generally horizontal attachment within a hopper section of the sweeper truck, the main frame portion including a generally rectangular main frame comprised of four main frame members connected end to end at right angles to one another, a main screen portion extending across the main frame between two or more of the main frame members; (b) a mechanism for attaching the filter apparatus within the sweeper truck; and (c) at least one V-shaped filter section, each extending downwardly from the main frame portion in a generally vertical direction. An upper portion of the V-shaped filter section is attached to the main frame portion. Each V-shaped filter section is at least partially covered with a screen.

Also included herein is a V-shaped filter device for use in a sweeper truck, including: (a) two generally rectangular, similarly-shaped side portions forming the sides of the V-shaped filter device, the side portions being adapted to extend in a downward direction from an upper portion of a hopper section of the sweeper truck, each side portion further including a side screen portion extending across the side portion, the side portions being joined to each other along their base; (b) two generally triangular shaped end screen portions, each attached along one of its sides to a side of the side portion, each triangular shaped end screen portion extending across an end of the V-shaped filter device; (c) an attachment mechanism along an upper part of the side portion for attaching the device to the hopper section; and (d) a mechanism for opening and closing one of the side portions along its base. The V-shaped filter device is adapted for deflecting debris downward into the bottom of the hopper and for temporarily collecting debris between the side portions.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

Figure 1:
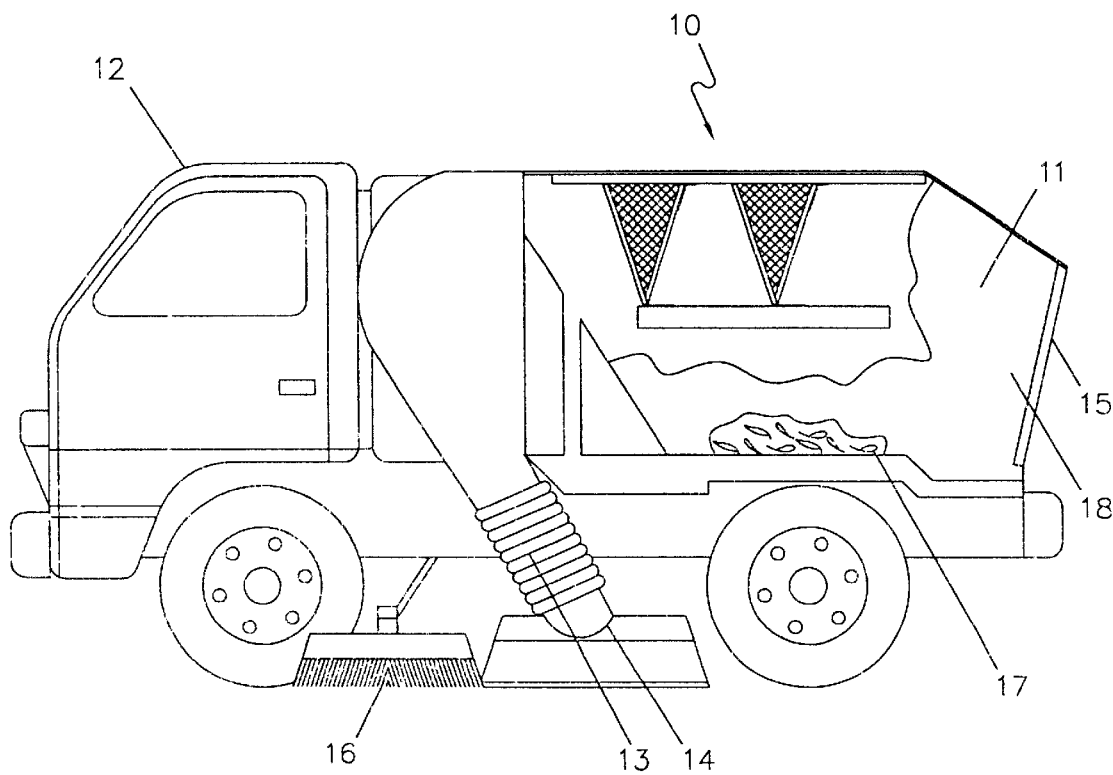
FIG. 1 is a perspective view of a vacuum sweeper truck with a filter apparatus according to the present invention, with a rear cutaway showing the hopper section.

In the following description, like reference characters designate like or corresponding parts throughout the several views. Also, in the following description, it is to be understood that such terms as "front," "rear," "within," and the like are words of convenience and are not to be construed as limiting terms. Referring in more detail to the drawings, the invention will now be described.

Referring to FIG. 1, an air filter apparatus 10 for a vacuum sweeper truck according to the present invention is positioned in a movable hopper section 11, which is in the rear of a vacuum sweeper truck. The truck section 12 of the vacuum sweeper truck, which includes a conventional truck cab, engine, transmission, alternator, battery, etc., also has a power source to generate a vacuum in a hose 13, or channel, attached to an intake port 14. This is normally a vacuum pump run by power from the engine. In general, the hoppers of vacuum sweeper trucks are designed with curved walls to encourage continuous, unobstructed air flow. Most hoppers have an air inlet and an air outlet along the wall adjacent to the truck section 12, in addition to a hopper door, or hopper door 15 facing the rear of the truck. The truck section is fitted with a collection aid, such as one or two sweeper brushes 16, or gutter brooms.

During the sweeping operation, the sweeper brush 16, which is ordinarily hydraulically operated, sweeps the street, parking lot, etc. In some models, a jet of high velocity air is also blasted onto the pavement to loosen debris. Debris 17 from the paved surface is sucked into the intake port 14 (see FIG. 1). The air stream circulates into the hopper section, where it weakens and much of the heavier debris, such as rocks and soda cans, drops out by the force of gravity into a collection container 18 at the bottom of the hopper section. Much of the lightweight debris, such as paper products, dirt particles, and leaves, circulating through the hopper section comes into contact with the filter apparatus 10. The debris 17 then either falls down by gravity into the hopper collection container 18, or is recirculated and again hits the filter apparatus 10. Lightweight debris, then, is likely to end up in the collection container. In this manner, the amount of debris which continues to circulate in the air stream within the hopper section is minimal. The spent air is exhausted through an exhaust port in the truck section.

Continuing to refer to FIG. 1, this is an on-going process until the sweeper action is turned off so that the hopper collection container 18 can be emptied. It is normally emptied by opening the hopper door 15 at the rear of the truck, and hydraulically raising the hopper section and tilting it up at an angle so that the debris slides from the collection container into a dumpster or other trash receptacle.

With the present filter apparatus, debris is unlikely to continue to circulate in the truck hopper, clogging up inlet or outlet ports. The truck operator need not make frequent stops in order to empty a collection container which is only partially filled with trash. Many hoppers have one or two cubic yards of useable capacity. With the filter apparatus of the present invention, the sweeping job can be continued until the collection container is full. This saves time, labor, and decreases on-the-job stress. Although it is preferably used in a vacuum sweeper truck, the present invention can also be adapted for use in the hopper of other types of sweeper vehicles. The filter apparatus 10 is lightweight and portable. The filter apparatus 10 is readily adaptable to fit sweeper machines currently in use and does not make use of water or any other additional medium that adds weight and cost to the sweeping operation.

Figure 2:
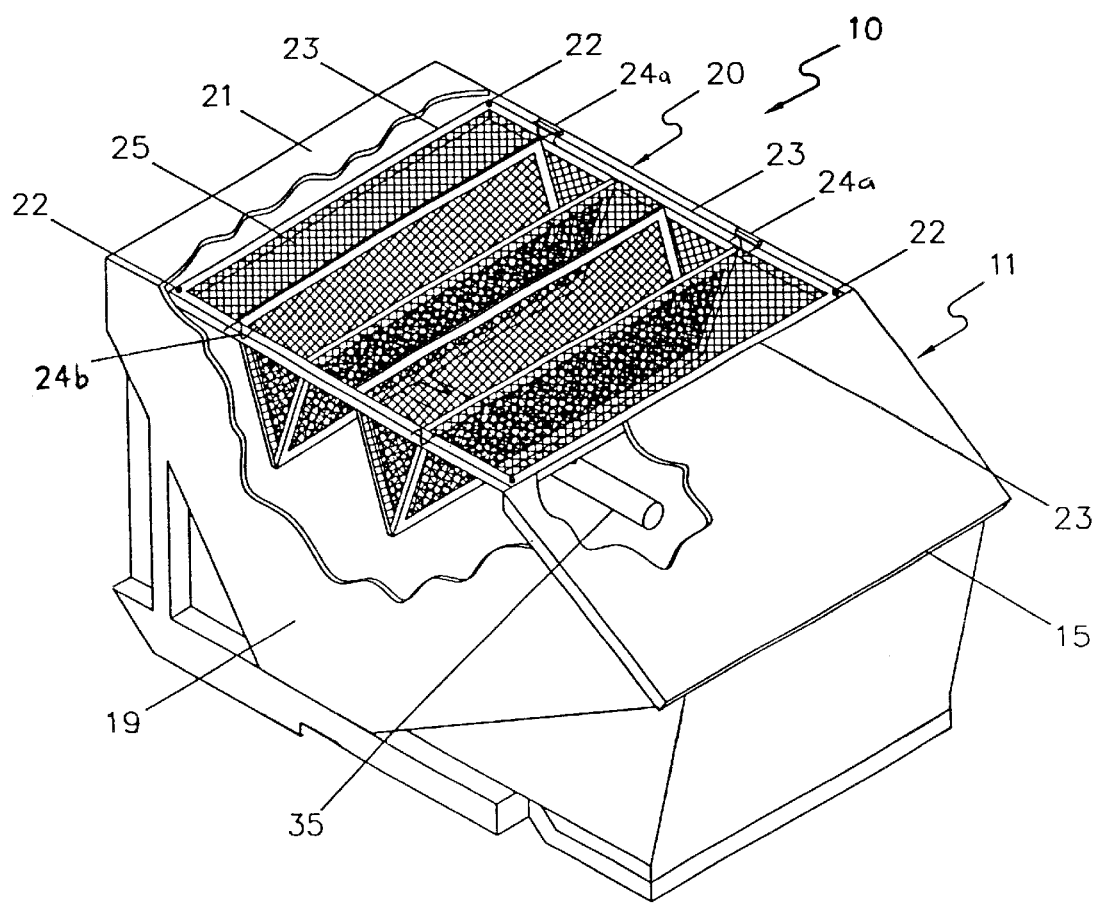
FIG. 2 is a perspective view of a hopper section with a filter apparatus according to the present invention, with a cutaway showing the filter apparatus.

In FIG. 2, a hopper section 11 is shown detached from a sweeper truck section 12 for purposes of illustration. A cutaway in the side wall 19 of the hopper section shows a preferred embodiment of a filter apparatus 10. It is preferably removable, although it can be permanently installed in a truck hopper. A removable filter apparatus according to the present invention is versatile in that it can be transferred from one sweeper truck to another, and from one type of sweeper truck to another. A removable filter apparatus 10 can be removed from the hopper for repair, replacement of parts, or thorough cleaning, and then replaced in the hopper.

As shown in FIG. 2, a main frame portion 20 of a filter apparatus 10 is bolted close to the ceiling 21 of the hopper section 11, which is shown cut away, by bolts or screws 22 placed through corresponding holes in the main frame. The generally horizontal main frame portion 20 is adapted for attachment within the hopper section. The main frame portion 20 comprises a generally rectangular main frame comprised of four main frame members 23 connected end to end at right angles to one another. The main frame portion 20 of the filter apparatus 10 need not extend the full width of the hopper section. The filter apparatus 10 is preferably located close to, and parallel to, the hopper ceiling 21.

Alternatively, the main frame portion 20, which is preferably rectangular in shape, can slide in and out between slight upper and lower protrusions 24a on the surface of the side walls 19 of the hopper section, as shown in FIG. 2. The protrusions guide left and right (opposite) main frame members of the main frame portion into the hopper. The left and right main frame members are preferably each curved in the same place, so as to fix the filter apparatus in place once it has been inserted in the hopper. The shape of the curves 24b corresponds to the shape of the protrusions 24a. This resembles a slidable shelf in a conventional home oven. Using these protrusions, a user can slide the filter apparatus 10 into, and out of, a hopper as necessary.

Figure 3:
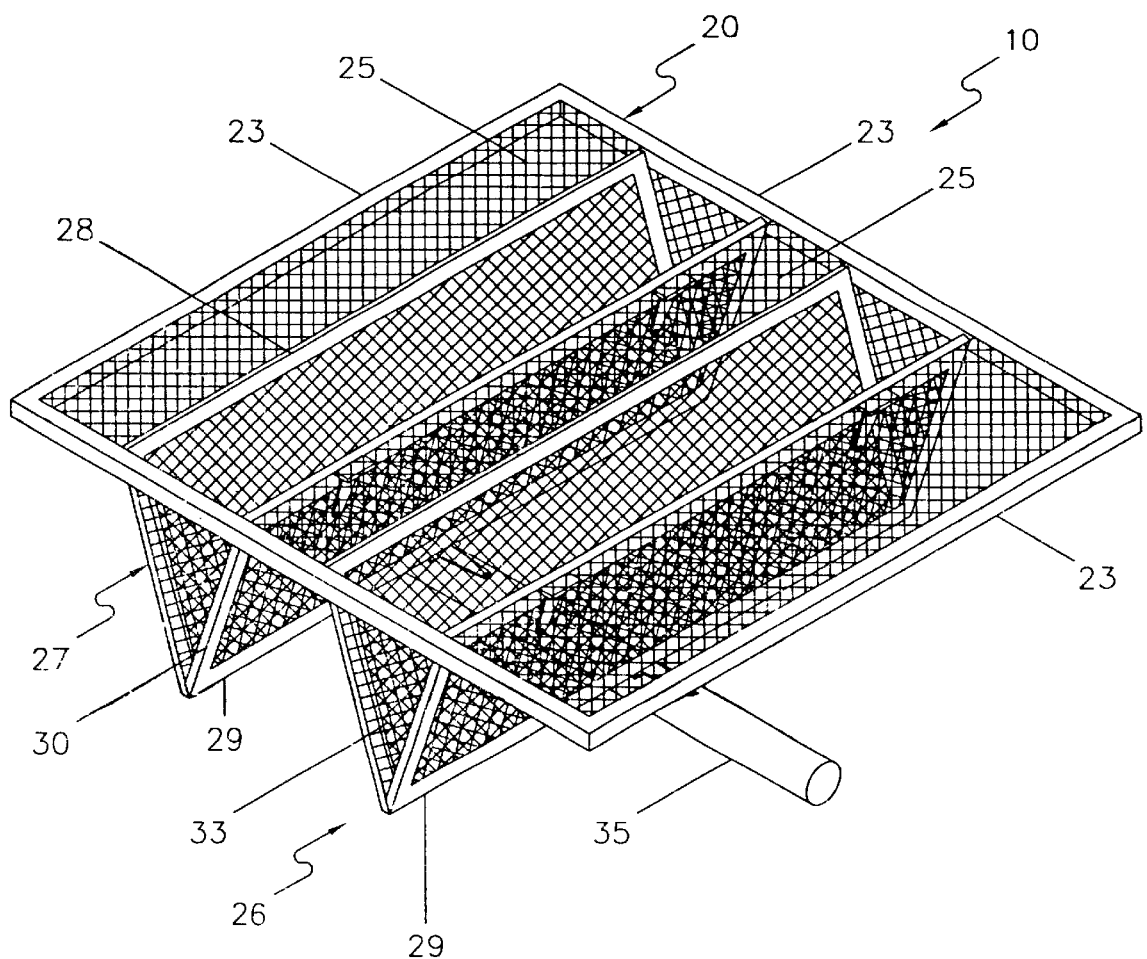
FIG. 3 is a perspective view of a filter apparatus according to the present invention.

Referring to FIGS. 3 through 6, a preferred embodiment of the filter apparatus 10 is comprised of a main screen portion 25, which extends across the main frame between two or more of the main frame members 23, and two or more V-shaped filter sections 26. As shown in FIG. 3, each V-shaped filter section 26 is comprised of two same-sized, rectangular side portions 27. Each side portion 27 is comprised of two opposite, horizontal, longer side frame members 28, 29, and two opposite, vertical shorter side frame members 30, with screen extending between the side frame members (see FIGS. 3 and 6). The shorter side frame members 30 extend down in a generally vertical direction from the horizontal plane of the main frame portion 20.

Figure 4:
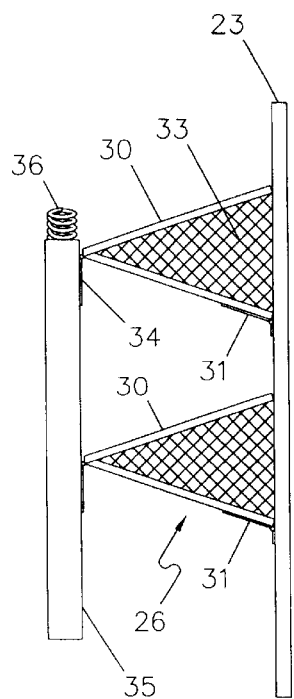
FIG. 4 is a side elevational view of the filter apparatus of FIG. 3.
Figure 5:
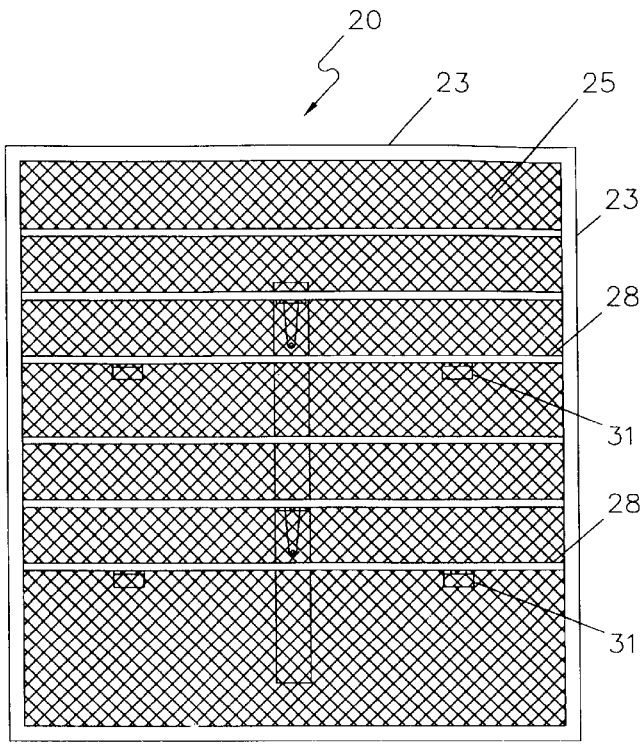
FIG. 5 is a top plan view of the filter apparatus of FIG. 3.
Figure 6:
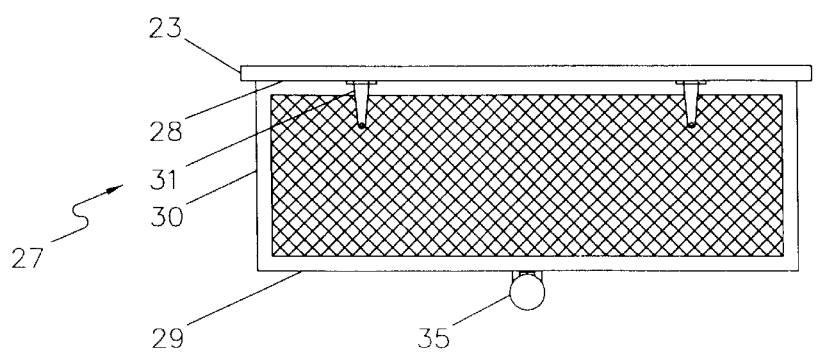
FIG. 6 is a front elevational view of the filter apparatus of FIG. 3.

As illustrated in FIGS. 4–6, one of the upper long side frame members 28 of each side portion 27 is movably attached, preferably by side portion hinges 31, across the main screen portion. The side portion located closest to the hopper door (front) in each V-shaped section 26 is moveable. The opposite side portion (rear) in each V-shaped filter section is preferably permanently affixed to the main screen portion. In FIGS. 3 and 5, the upper long side frame members 28 extend from one side of the main frame portion 20 to an opposite side. The front upper long side frame member is hinged to the main screen portion 25, or to a main frame member which crosses the main screen portion, so that the front side portion can be moved back and forth. Steady state, though, is for both of the lower long side frame members 29 in a V-shaped filter section to adjoin. This forms the V-shapes in the filter apparatus 10. These lower long side frame members 29 of each side portion 27 are less preferably permanently affixed to each other. The front lower long side frame members 29 is preferably movably affixed to a cleaning rod 32, as shown in FIGS. 3 and 4 and described below. Triangular-shaped end screen portions 33, each of which is attached to a short side frame member 30, extend across the triangular-shaped ends of each V-shaped filter section 26.

Figure 7:
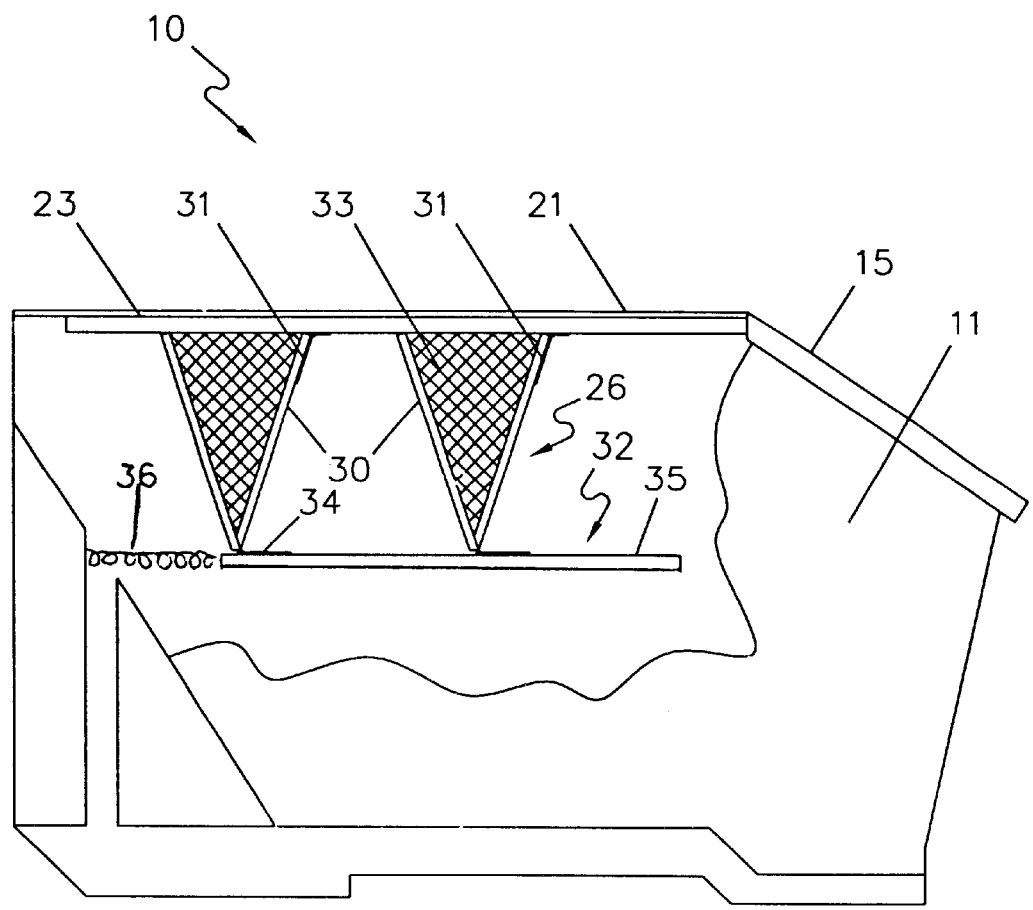
FIG. 7 is an elevational view of the hopper section and filter apparatus of FIG. 4.

As illustrated in FIGS. 4–7, the cleaning rod 32 is movably attached to the front lower side frame member 29 by a cleaning rod hinge 34, which is positioned near the apex of each V-shaped filter section 26. The cleaning rod is preferably a rectangular stick-shaped, or cylindrical, broomstick-shaped, wooden rod. The cleaning rod 32 has a handle end 35 that extends toward the hopper door 15, as shown in FIG. 7. Any V-shaped filter sections 26 are attached to the cleaning rod behind the handle 35 toward the cab section of the truck.

As illustrated by the preferred embodiment of FIGS. 4 and 7, an opposite end of the cleaning rod 32 is attached to a spring 36. The opposite end of the spring 36 is attached to the rear wall of the hopper, which is the wall of the hopper closest to the truck cab, as shown in FIG. 7. This spring exerts pressure on the cleaning bar to hold the movable front side portions of each V-shaped section closed. An operator can open the V-shaped section by opening the hopper door and pulling the cleaning bar. A hopper door can be opened manually or hydraulically, depending upon the type of sweeper truck. The cleaning rod 32 is spring loaded so that the V-shaped filter sections 26 snap shut again when the cleaning rod is released by the operator. Counterweights may be used instead of a rod and spring for the same purpose.

The sweeper truck shown in FIGS. 2 and 7 is a "high dump", while the hopper illustrated in FIG. 1 belongs in a "low dump" sweeper truck. The former is designed for dumping to a dumpster, which is ordinarily five feet high. In a "high dump" truck, the hopper door opens and the trash is raked out. A "low dump" sweeper truck has a hydraulically operated hopper that raises up to dump waste. A preferred embodiment of the filter apparatus 10 includes front side portions 27 that open by gravity when the hopper is raised up and tipped for dumping. In that instance, a cleaning rod and spring are not required. When the hopper is lowered again, the front side portions would close again.

If the operator requires greater assurance of a tight fit when the V-shaped filter section 26 is being used in the normal mode with the filter fixed in its V-shape, small magnets may be attached along the triangular portion of the screen's outer unattached edge. Corresponding magnets would be fixed along the inner surface of the unattached short side frame member 30. However, magnets are not necessary to maintain a fully screened filter surface.

Figure 8:
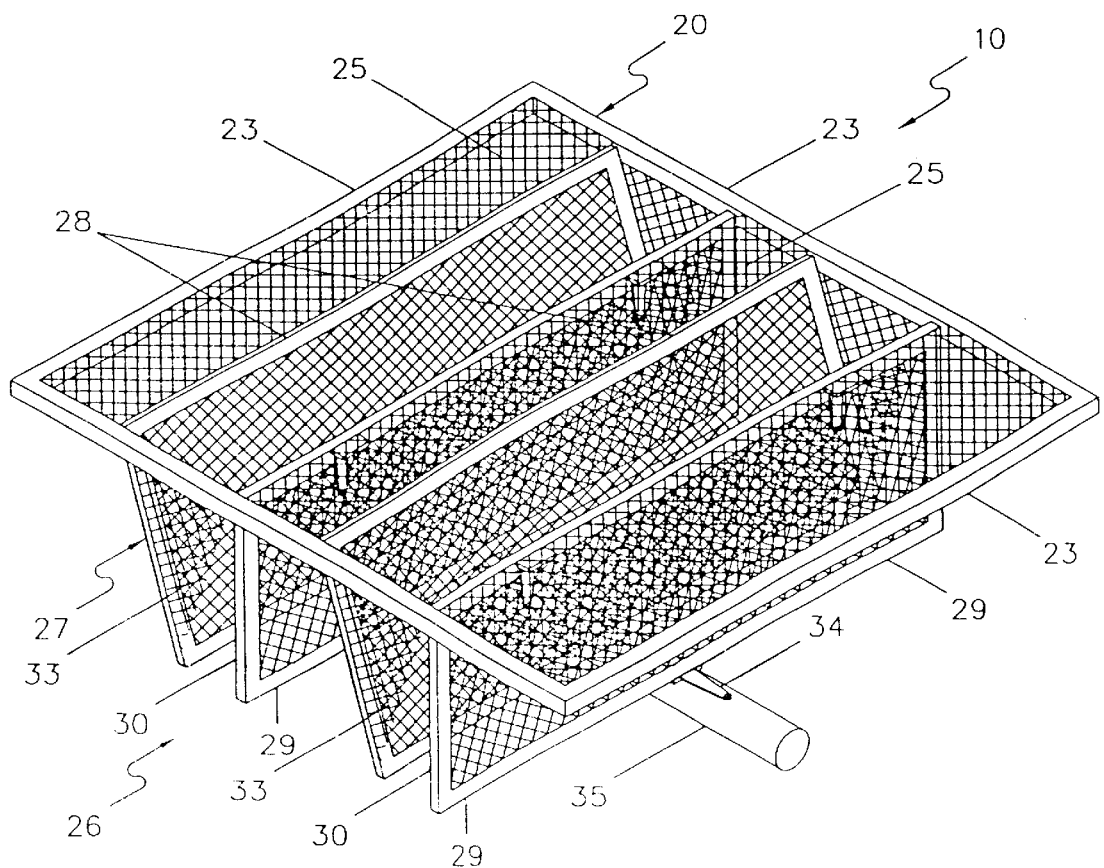
FIG. 8 is a perspective view of the filter apparatus of FIG. 3, showing the V-shaped filter sections in a released position.

Referring to FIGS. 7 and 8, the sides of the V-shaped filter sections 26 are made of a screen material, preferably a wide gauge wire mesh, and the main portion of the apparatus is screened as well. As depicted in the cutaway of FIG. 7, the filter apparatus 10 is positioned in the upper part of the hopper section 11. In use, the air and debris stream, which is sucked in through the sweeper truck's intake port 14, gradually loses speed in the hopper section 11. Although the air stream can move through the screening in the filter apparatus 10, most debris cannot. Larger, heavier debris quickly falls out into the collection container at the bottom of the hopper section. The shape and position of the filter is designed to catch debris flying in the air stream and direct it downward. The V-shape and its triangular screened sides provides surface area in the back and front of the V-shapes, as well as on the ends, so debris coming from any direction in the hopper section will eventually impact the present apparatus. Some of the smaller particles, especially leaves and paper, fall between the slats of the V-shaped filters. These particles are collected in the V (between the side portions) and held. Later, the operator stops the truck in order to empty the collection container. He or she opens the hopper door and pulls the cleaning rod out (towards himself). One motion opens all of the triangular V-shaped filter sections, as shown in FIG. 8. When the side portions open, the collected particles fall down into the collection container 18 for emptying with the rest of the debris. The filter apparatus 10 is then ready for reuse.

Continuing to refer to FIG. 8, when the cleaning rod 32 is pulled outwardly, it moves the cleaning rod hinges 34 and pulls open the front lower long side frame members 29 of the V-shaped filter sections 26. The front side portions 27 then hang more or less vertically, releasing any debris 17 previously trapped inside the V-shaped filter section 26. Of course, an operator should not engage the cleaning rod 32 until the vacuum is turned off and airflow ceases. Also, pulling the cleaning rod in-and-out will shake the side portions, further encouraging collected debris to dislodge from the screening and fall into the collection container. Smaller, lighter particulate matter collected on the screens is quickly and easily purged by this cleaning process. In the preferred embodiment, the screening material is a sturdy, heavy gauge steel mesh that is securely attached along its sides to frame members of the filter apparatus. The triangular-shaped end screen portions 33 on the ends are rigid and retain their shape when they move away from the side portion 27 of the V-shaped filter section 26 during dumping of the collected debris. When the V-shaped filter section 26 is in place during normal operation of the vacuum sweeper truck 11, the unattached edge of the triangular-shaped end screen portion 33 fits snugly into the opposite short side frame member 30 of the V-shaped filter section 26 without allowing small pieces of debris to pass between.

Thus, this filter apparatus 10 includes:
(a) a generally horizontal main frame portion 20 adapted for attachment within the hopper section 11, the main frame portion 20 comprising a generally rectangular main frame comprised of four main frame members 23 connected end to end at right angles to one another, and a main screen portion 25 extending across the main frame between two or more of the main frame members 23;
(b) a mechanism for attaching the filter apparatus to the hopper section, preferably bolts or screws 22 and corresponding holes on the upper frame member 28; and
(c) at least one V-shaped filter section 26 extending downwardly from the main frame portion 20 in a generally vertical direction. The V-shaped filter section 26 is comprised of two generally rectangular-shaped side portions 27. Each side portion is comprised of an upper and a lower longer side frame member 28, 29, each of which is attached at both ends to ends of two shorter side frame members 30 at right angles to one another. Each side portion further comprises a side screen portion extending between the side frame members, and the lower long side frame members 29 of each side portion 27 in a V-shaped filter section 26 are adjacent to one other. At least one upper long side frame members 28 of the V-shaped filter section 26 is movably attached to the main frame portion, the upper long side frame members 28 extend across the main screen portion 25 of the main frame portion 20, and the long side frame members 29 of each side portion 27 of each V-shaped filter section 26 are generally parallel to one other.

The apparatus preferably further includes one or more of the following:

1) Two triangular-shaped end screen portions 33, each attached along one of its sides to one of the short side frame members 30; wherein each of the triangular-shaped end screen portions 33 extends across an end of the V-shaped filter section 26.

2) A cleaning rod 32 movably attached to a front one of the lower long side frame members 29 in a V-shaped filter section 26, wherein the cleaning rod 32 extends in a direction that is generally perpendicular to the direction that the lower long side frame member extends in, and wherein the cleaning rod is parallel to and below the main frame portion 20. The cleaning rod 32 is adapted for manually opening the V-shaped filter section 26 and allowing built up debris within the V-shaped filter section to fall down into a collection container within the hopper section 11. A spring 36 may be attached at one end to a rear facing end of the cleaning rod 32 and at an opposite end to a rear wall of the hopper section 11. The cleaning rod 32 is preferably hinged to a front lower long side frame member 29 of the side portion, and is adapted for separating the lower side frame members 29 in a V-shaped filter section and opening the V-shaped filter section 26.

A preferred embodiment of the present invention includes one or more of the following:

1) A front one of the side portions 27 is movable away from the opposite side portion.

2) The filter apparatus 10 includes two of the V-shaped filter sections 26, which are parallel to one another and to a hopper door 15 at the rear of the sweeper truck.

3) The main screen portion 25 extends across the main frame portion 20 in three segments. The three main screen portion segments extend across two opposite main frame members, one main screen portion segment being between the two V-shaped filter sections, the other two main screen portion segments each extending between a V-shaped filter section and an end of the main frame portion.

4) The upper long side frame members 28 are the same length as two opposite main frame members 23.

5) At least one of the upper long side frame members 28 of the side portions 27 of the V-shaped filter sections 26 is movably attached to the main frame portion 20 by hinges 31.

6) Two opposite main frame members 23 include curves 24b for slidable placement between a set of correspondingly curved upper and lower protrusions 24a on opposite side walls of the hopper section 11.

The filter apparatus 10 herein may include from one to about five V-shaped filter sections 26. Each filter sections may be narrow or wide. The V-shaped filter sections are preferably substantially identical to one another, and positioned parallel to one another across the main frame portion 20, and parallel to the hopper door. The main screen portion 25 preferably does not extend across the top of the V-shaped filter sections 26. For removable filter apparatus, the main frame portion 20 is no larger than the hopper door, so the apparatus can fit through the hopper door for attachment to the hopper near its ceiling. The present filter apparatus can alternatively be made in pieces which are then attached to one another once they are inside the hopper. Alternatively, the filter apparatus of the present invention can be installed in the truck hopper in the factory.

The length, width, and height of the main frame portion 20 are less than the length, width and height, respectively, of the hopper section. The filter apparatus of the present invention is preferably between about 18 and 36, most preferably about 30 to 34, inches in length (front to back). The present filter apparatus is preferably between about six and 18, most preferably about ten to 14, inches wide (left to right). The filter apparatus is preferably between about six inches and about 20, most preferably about 12 to 16, inches in height so that it extends down into the air stream that flows through the upper portion of the hopper section 11. On occasion, when the collection container is full, the debris level will approach the cleaning rod. The screen is of a mesh size sufficient to allow visible particles of leaves to pass through, but not sufficiently large to allow rocks to pass through. One square of a screen portion herein is most preferably between about ¼ and 1 inch in width and length.

Also included in the present invention is a V-shaped filter device for use in a vacuum sweeper truck. The V-shaped filter device is a V-shaped filter section 26, which functions in a similar way even without the upper main frame portion 20. The V-shaped filter device 26, which resembles an inverted pup tent, includes:

(a) two generally rectangular, similarly-shaped side portions 27 forming the sides of the V-shaped filter device 26, the side portions 27 being adapted to extend in a downward direction from an upper portion of the hopper section 11, each side portion further comprising a side screen portion extending across the side portion, the side portions 27 being joined to each other along their base (at the apex of the "V");

(b) two generally triangular-shaped end screen portions 33, each attached along one of its sides to a side of the side portion 27, each end screen portion extending across an end of the V-shaped filter device 26;

(c) an attachment mechanism, preferably bolts or screws 22 and corresponding holes on the upper frame member 28, along an upper part of the side portion 27 for attaching the device 26 to the hopper section 11; and (d) a mechanism for opening 31,32 and closing one of the side portions 27 along its base. The V-shaped filter device 26 is adapted for deflecting debris downward (into the bottom of the collection container), and for temporarily collecting debris between the side portions 27.

In a preferred embodiment of the V-shaped filter device:

1) Each side portion 27 is comprised of an upper and a lower long side frame member 28, 29, each of which is attached at both ends to ends of two short side frame members 30 at generally right angles to one another, the short side frame members being shorter in length than the long side frame members, and wherein the side screen portion extends between the side frame members, and the lower long side frame members 29 of each side portion 27 adjoin one another.

2) Each triangular-shaped end screen portion is attached along one of its sides to one of the short side frame members 30 and extending across an end of the V-shaped filter device 26.

3) The mechanism for opening one of the side portions 27 comprises a hinge 31 attached to the upper side frame member 28 of the openable side portion.

4) The mechanism for opening one of the side portions includes a cleaning rod 32 attached to the lower side frame member 29 of the openable side portion. The cleaning rod 32 is attached to the side portion in a position that is perpendicular to the openable (movable) side portion. A spring is preferably attached at one of its ends to a rear facing end of the cleaning rod, and at an opposite end to a rear wall of the hopper section.

Figure 9:
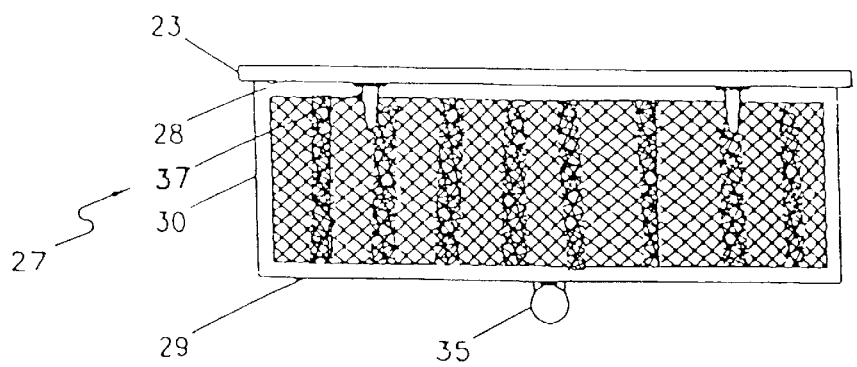
FIG. 9 is a front elevational view of a filter apparatus according to the present invention.

In an alternate embodiment shown in FIG. 9, a different, flexible screen material is employed in the filter apparatus 10. In this embodiment, the flexible screen material is wrinkled or folded so that the surface area is approximately doubled over the previous embodiment, which preferably employs a heavy gauge steel. This screen material is most preferably folded in an accordion-like fashion before it is attached to the frame members. Trash, especially paper products, is less likely to adhere to a wrinkled, or folded, surface than to a smooth surface. The folded surface will deflect more debris and collect less debris within the V-shaped filter sections 26. In FIG. 9, a side portion 27 includes a screen with a plurality of vertically oriented folds 37. The folds 37 of the flexible screen material are preferably oriented in a vertical direction in the hopper section to aid in the deflection of debris downward into the collection container.

Although the V-shaped filter sections are designed to work with large vacuum truck sweeper systems, the filter apparatus of the present invention could be adapted for use with a ride sweeper (which resembles a lawn tractor), or lawn tractors. Smaller V-shaped filter sections could be made to fit the collection bags of lawn tractors or riding law mowers. Grass and small pieces of leaves and shrubbery that are continuously circulated in the vacuum mower apparatus would collect on the bottom surface of the V-shaped filters sections as described herein.

From the foregoing it can be realized that the described device of the present invention may be easily and conveniently utilized as a filter apparatus. It is to be understood that any dimensions given herein are illustrative, and are not meant to be limiting.

While preferred embodiments of the invention have been described using specific terms, this description is for illustrative purposes only. It will be apparent to those of ordinary skill in the art that various modifications, substitutions, omissions, and changes may be made without departing from the spirit or scope of the invention, and that such are intended to be within the scope of the present invention as defined by the following claims. It is intended that the doctrine of equivalents be relied upon to determine the fair scope of these claims in connection with any other person's product which fall outside the literal wording of these claims, but which in reality do not materially depart from this invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A filter apparatus for use in a sweeper truck, the apparatus comprising:
    (a) a main frame portion adapted for generally horizontal attachment within a hopper section of the sweeper truck, the main frame portion comprising a generally rectangular main frame comprised of four main frame members connected end to end at right angles to one another, a main screen portion extending across the main frame between two or more of the main frame members;
    (b) a mechanism for attaching the filter apparatus within the sweeper tuck; and
    (c) at least one V-shaped filter section extending downwardly from the main frame portion in a generally vertical direction, an upper portion of the V-shaped filter section being attached to the main frame portion, each V-shaped filter section being at least partially covered with a screen;
        wherein the V-shaped filter section is comprised of two generally rectangular-shaped side portions, each side portion being comprised of an upper and a lower long side frame member, each long side frame member having two opposite ends and being attached at both ends to opposite ends of two short side frame members at right angles to one another, the long side frame members being longer in length than a short side frame members, each side portion further comprising a side portion of the screen, the side screen portion extending between the side frame members, the lower long side frame members of each side portion in a V-shaped filter section being adjacent to one other; and wherein the upper long side frame members extend across a portion of the main screen portion of the main frame portion, and the long side frame members of each side portion of each V-shaped filter section are generally parallel to one other.

2. A filter apparatus according to claim 1, further comprising two triangular-shaped end screen portions, each attached along one of its sides to one of the short side frame members; wherein each of the triangular shaped end screen portions extends across an end of the V-shaped filter section.

3. A filter apparatus according to claim 1, wherein a front one of the side portions is movable away from the opposite side portion.

4. A filter apparatus according to claim 3, wherein the filter apparatus comprises two of the V-shaped filter sections, each being generally parallel to one another and to a hopper door at the rear of the sweeper truck.

5. A filter apparatus according to claim 4, wherein the main screen portion extends across the main frame portion in three segments, the three main screen portion segments extending across two opposite main frame members, one main screen portion segment being between the two V-shaped filter sections, the other two main screen portion segments each extending between a V-shaped filter section and an end of the main frame portion.

6. A filter apparatus according to claim 4, wherein the upper long side frame members are the same length as two opposite main frame members.

7. A filter apparatus according to claim 1, wherein at least one of the upper long side frame members of the V-shaped filter sections is movably attached to the main frame portion by hinges.

8. A filter apparatus according to claim 4, further comprising: a cleaning rod movably attached to a front one of the lower long side frame members in a V-shaped filter section, wherein the cleaning rod extends in a direction that is generally perpendicular to the direction that the lower long side frame member extends in, and wherein the cleaning rod is parallel to and below the main frame portion.

9. A filter apparatus according to claim 8, further comprising a spring attached at one end to a rear facing end of the cleaning rod and at an opposite end to a rear wall of the hopper section.

10. A filter apparatus according to claim 8, wherein the cleaning rod is hinged to-a front lower long side frame member of the side portion, and is adapted for separating the lower side frame members in a V-shaped filter section and opening the V-shaped filter section.

11. A filter apparatus according to claim 1, wherein two opposite main frame members comprise cues for slidable placement between a set of correspondingly curved upper and lower protrusions oil opposite side walls of the hopper section.

12. A filter apparatus according to claim 2, wherein the mechanism of attachment comprises bolts or screws and corresponding holes on the upper side frame member.

13. A V-shaped filter device for use in a vacuum sweeper truck, comprising:
 (a) two generally rectangular, similarly-shaped side portions forming the sides of the V-shaped filter device, the side portions being adapted to extend in a downward direction from an upper portion of a hopper section of the sweeper truck, each side portion further comprising a side screen portion extending across the side portion, the side portions being joined to each other along their base;
 (b) two generally triangular shaped end screen portions, each attached along one of its sides to a side of the side portion, each end screen portion extending across an end of the V-shaped filter device;
 (c) an attachment mechanism along an upper part of the side portion for attaching the device to the sweeper truck; and
 (d) a mechanism for opening and closing one of the side portions along its base;
  wherein the V-shaped filter device is adapted for deflecting debris downward and for temporarily collecting debris between the side portions.

14. A V-shaped filter device according to claim 13, each side portion being comprised of an upper and a lower long side frame member, each of which is attached at both ends to ends of two short side frame members at generally right angles to one another, the short side frame members being shorter in length than the long side frame members, and wherein the side screen portion extends between the side frame members, and the lower long side frame members of each side portion adjoin one another.

15. A V-shaped filter device according to claim 14, wherein each triangular-shaped end screen portion is attached along one of its sides to one of the short side frame members and extending across an end of the V-shaped filter device.

16. A V-shaped filter device according to claim 14, wherein the mechanism for opening one of the side portions comprises a hinge attached to the upper side frame member of the openable side portion.

17. A V-shaped filter device according to claim 16, wherein the mechanism for opening one of the side portions further comprises a cleaning rod attached to the lower side frame member of the openable side portion, the cleaning rod being attached to the openable side portion in a position that is perpendicular to the openable side portion.

18. A V-shaped filter device according to claim 17, further comprising a spring attached at one end to a rear facing end of the cleaning rod and at an opposite end to a rear wall of the hopper section.

19. A V-shaped filter device according to claim 13, wherein the side portion comprises a screen having a plurality of vertically oriented folds.

* * * * *